United States Patent [19]
Ashikian

[11] 3,767,333
[45] Oct. 23, 1973

[54] ENERGY CONVERTERS WITH CRANKPIN CONCENTRIC PISTONS

[76] Inventor: Baruir Ashikian, 505 Frechette, Sherbrooke, Quebec, Canada

[22] Filed: Sept. 3, 1971

[21] Appl. No.: 177,648

[52] U.S. Cl. .................. 418/56, 418/57, 418/64, 418/138, 418/142, 418/178
[51] Int. Cl. ........ F01c 1/02, F03c 3/00, F04c 17/02
[58] Field of Search ................ 418/56, 57, 64, 138, 418/142, 178

[56] References Cited
UNITED STATES PATENTS
2,604,052   7/1952   Eickele .................................. 418/56
3,195,470   7/1965   Smith .................................... 418/56

FOREIGN PATENTS OR APPLICATIONS
221,057   9/1924   Great Britain ........................ 418/64
774,755   5/1957   Great Britain ........................ 418/64
915,194   7/1946   France .................................. 418/64

Primary Examiner—Carlton R. Croyle
Assistant Examiner—John J. Vrablik

[57]   ABSTRACT

A crankpin concentric piston moves within a cylindrical bore having two end covers, fluid admission and discharge ports and a radial blade fixed between these ports. The piston, consisting of an elastic cylinder embracing the radial blade, is conveniently preloaded against the cylinder's inner wall, along a contact line dividing the space between the cylinder, the piston, the end plates and the radial blade in two chambers, which admit and expel the fluid as the crankshaft is rotated. The piston's elastic preloading against the cylinder wall and the radial blade, and special end seals ensure automatic compensation for wear and thermal expansion.

9 Claims, 6 Drawing Figures

PATENTED OCT 23 1973

INVENTOR
BARUIR ASHIKIAN

INVENTOR
BARUIR ASHIKIAN

ENERGY CONVERTERS WITH CRANKPIN CONCENTRIC PISTONS

CROSS-REFERENCE TO RELATED APPLICATION

A part, named "Annular spring" and used as an alternate component for the energy converter described in the following disclosure, has made the object of a previous application for U.S. patent presented by the same inventor. This application was sent to the U.S. Patent Office on August 25, 1971.

This invention relates to machines transforming mechanical work into fluid energy, or vice-versa, with the use of variable volumes generated by a non-reversing motion between minimum two major components.

The failure of many proposed machines in this category and the inability of the successful ones to operate with high pressure ratios per stage, with reasonable volumetric efficiencies at low flow rates and with little wear, stem mainly from sealing difficulties and high rubbing speeds between some components. Furthermore many proposed machines, alleged to be simpler than the alternating piston machines, have in fact too many moving components and hence excessive wear and low reliability.

My invention is intended to overcome some of the limitations and weaknesses associated with the aforementioned type of machines. In my invention, a piston concentric to a crankpin and made of springy material moves within a cylindrical bore of the piston's length and closed at its both ends. A longitudinal end to end slot in the piston wall allows it to slide with moderate clamping pressure over a fixed blade, which extends radially inwards from the entire length of the cylinder wall. The piston is constantly pressed against the cylindrical wall by an elastic positionning assembly installed between piston's inner surface and a crank assembly of constant eccentricity.

The internal preloading forces, existing at the piston and cylinder contact line, depend upon the elastic deflection of the piston positionner and upon the fluid pressure. The initial deflection must be chosen to ensure operation at nominal pressure in spite of wear and thermal expansion. In compressors, as the discharge pressure increases, the piston-cylinder contact forces diminish during the compression with subsequent momentary reduction in friction. At a given pressure the piston might float on a thin layer of fluid escaping from the high to the low pressure side.

The piston carries at its both ends flexible sealing devices preloaded against the piston's inner wall and also between the end walls and the corresponding sides of the piston positionner or spacer. Crankshaft's rotation relative to the cylinder, or vice-versa, produces cyclic volume variations for the two chambers confined between the cylinder, the piston, and the radial blade and separated by the elastically loaded piston-cylinder contact line. Fresh fluid is admitted through a port into the increasing chamber, while the previously admitted one is expelled, through another port, from the diminishing chamber. The converter operates as a fluid motor if the fluid enters with high energy and leaves with lower energy and as a compressor or pump in the opposite case.

Further features of my invention will become apparent from the following description and appended claims referring to the accompanying drawings, which show a few embodiments of the invention.

Figure 1:
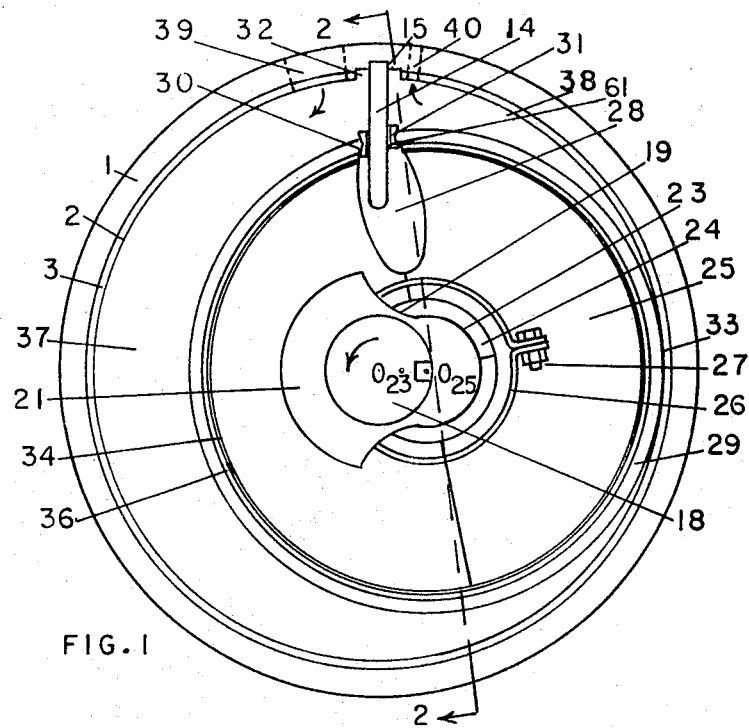
FIG. 1 is a front view of an energy conversion unit using an elastic block as a piston positionner; the front end cover has been removed for clarity.

Omitted from the drawings and the following description are such features as cooling means, various fasteners, valves, inlet and outlet housing, lubrication system and the like. These features vary according to the particular function of the energy conversion unit, and although vital for proper operation, are quite irrelevant in the context of this disclosure and its appended claims.

Referring to the drawings, 1 denotes an outer casing having a cylindrical bore 2, lined with bearing material 3, and being closed with two end covers 4 and 5 which have conical peripheries 6 and 7 engaging the bevelled ends 8 and 9 of the cylinder wall; this last feature causes, during installation, the gradual radial preloading between the piston assembly and the cylinder. The aforementioned end covers have inner flat surfaces 10 and 11 at right angles to the cylinder bore and located between the aforementioned conical peripheries and the crankshaft's bearings 12 and 13.

A straight blade 14, of narrow rectangular cross section, fits tightly along one of its long sides in a suitable groove 15 made in the cylinder liner and wall and along its both short sides in radial grooves 16 and 17 made in the end walls 10 and 11. The afoementioned crankshaft bearings 12 and 13 are located at the center of each end cover.

The crankshaft 18 has two cranks 19 and 20, each carrying a balance weight 21 and 22 and a crankpin 23 which is surrounded by a split bearing 24, surrounded in turn by a split block of suitable elastic material 25 hereafter named, "piston positionner." Crankpin bearing and piston positionner are secured together around the crankpin with two clamps 26 located around both ends of the positionner, the clamps themselves being joined with bolt-nut assemblies 27.

The piston positionner has a longitudinal end to end slot 28, suitably shaped to clear, at all times, the radially located blade 14 and is surrounded, in turn, by a near circular piston 29 of springy material and having the same length as the cylinder bore, but a smaller diameter. The piston has a longitudinal end to end cut 30 which is expanded during the installation to allow enough room for the radial blade's width, and for two sealing blades 31 which remain in constant preloaded contact with piston's rounded edges and with the radial blade 14. This preloading is possible thanks to piston's springiness and to the clearance left between the outer diameter of the positionner 25 and the inner diameter of the piston 29. The cylinder liner 3 and the cylinder itself have adequate recesses 32, on both sides of the blade 14, in order to accommodate the sealing blades 31 when the crank arrives at its top dead center the sealing blades have linings 61 made of suitable bearing material.

Before assembly, crankpin's eccentricity plus piston positionner's outside radius, plus piston wall thickness made a length slightly exceeding the cylinder bore radius. The tightening of end cover tie bolts, during assembly, results in a gradual compression of the piston positionner along crankpin's eccentricity and this action is facilitated by the aforementioned conical surfaces 6,7,8 and 9. When in its proper place, the piston 29 maintains a forced contact line 33 with the cylinder wall 2 and the said line revolves when the unit is in operation. The use of an elastic block 25 slightly offcentered with respect to the crankpin 23 leads to a circumferentially variable preloading which is useful in gas or vapor handling units. This eccentricity is shown in FIG. 1 as the grossly exagerated distance between the centers $O_{23}$ and $O_{25}$.

Located between piston's inner surface, the positionner and the end walls are flexible sealing devices made of springy material. Each seal consists of a cylindrical thin strip 34 having uniformly spaced, narrow and bowed extensions 35. Each cylindrical strip, cut to leave passage for the radial blade 14, is covered with narrow strips 36 of suitable bearing material extending slightly beyond the strip edges. The width of each strip 34 and the length of its bowed extensions 35 are chosen to produce a moderate longitudinal preloading and the strip's uncoiling tendency is capable of applying a moderate radial preloading. All the aforementioned contact lines and surfaces prevent the occurance of any significant fluid leakage across them and provide an automatic compensation for wear and thermal expansion. This assures reasonably long operation between overhauls, high pressure ratios, and high volumetric efficiencies.

Confined between the cylinder wall, the radial blade and the piston are two chambers 37 and 38, separated by the cylinder-piston contact line 33, and provided with suitable ports 39 and 40 for admitting and discharging the working fluid. These ports are located in the outer casing 1, on either side of the sealing blade recesses 32.

The energy conversion unit operates as follows: crankshaft's rotation relative to the stationary casing 1 produces a relative motion between the radial blade 14 and the piston 29 and between the latter and the cylinder bore 2. This motion creates simultaneous opposite volume changes for the chambers 37 and 38 while their total volume remains constant. The corresponding sliding speeds are inferior to those encountered in the vane type rotary converters having the same displacement and speed. As the crank turns anticlockwise, away from its top dead center position, so does the contact line 33 and the volume of chamber 37 increases while that of chamber 38 decreases.

In an energy conversion unit operating as a compressor or pump, the discharge port 40 is fitted with a non-illustrated check valve; fresh fluid is drawn into the chamber 37 through the port 39, while that admitted during the previous cycle is compressed in chamber 38 until its pressure exceeds that in the delivery system after which it is discharged through the port 40 and the aformentioned check valve.

In an energy conversion unit operating as gas or liquid motor, the port 39 is preceeded by a non-illustrated suitable admission valve which controls the power developped by the unit.

The entire operation is equally possible if the crankshaft is held stationary while the cylinder is allowed to rotate; this arrangement becomes advantageous in certain special cases.

Lubrication requirements could be substantially reduced by covering the following parts with self-lubricating linings: cylinder bore 2, sealing blades 31, and flexible sealing strips 36.

Figure 2:
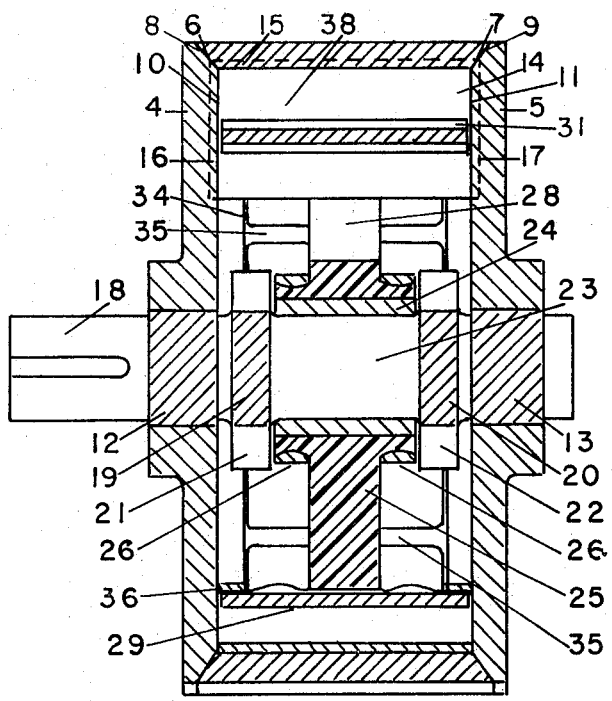
FIG. 2 is a longitudinal section of the energy conversion unit along the line 2—2 of FIG. 1; the front end cover has been reinstalled.

The foregoing description of an energy conversion unit referring to the FIGS. 1 and 2 covers some features which could be altered without departing from the basic concepts underlying the invention. For example, fresh fluid could be drawn within the piston and admitted into the working chamber through ports in the piston wall; the entire outer casing could be made of two halves joined together in a diametral plane; the check valves could be replaced with cam operated valves; the crankshaft could be of the overhung or multipiece type, in which case the bearing and the positionner surrounding the crankpin do not have to be split; the number of crankpins and positionners within the same unit could exceed one of each; the radial blade could have a cross section other than a rectangular one and could accommodate either the admission or the evacuation port, or even both. The preceeding brief presentation of possible changes is by no means exhaustive and many others could be added, some not even mentioned and some actually tried and illustrated in the FIGS. 3 to 6 inclusive.

Figure 3:
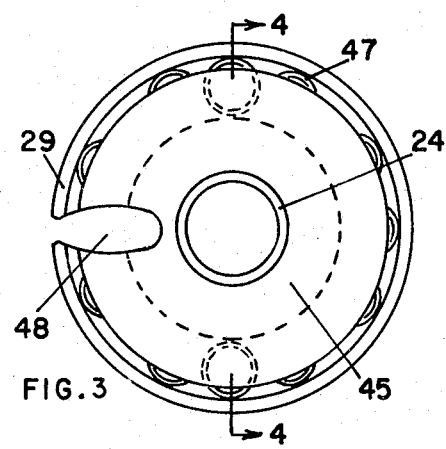
FIG. 3 is a front view of a piston positionner, equipped with cylindrical springs used alternatively in the energy conversion unit, and of the piston.
Figure 4:
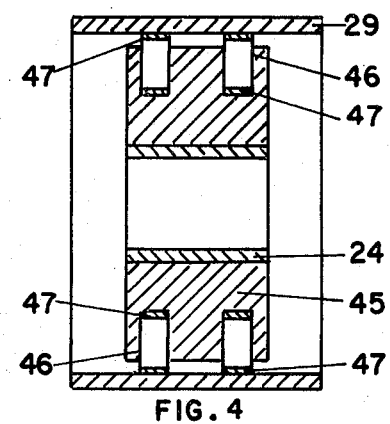
FIG. 4 is a longitudinal section of the piston positionner along the line 4—4 of FIG. 3.

FIGS. 3 and 4 show a piston positionner with a light weight cylindrical block 45, having two rectangular grooves 46, and a slot 48 to clear the radial blade 14. Located within each groove 46 are several thin walled short cylinders 47 capable of radial elastic deflection. The entire subassembly is surrounded by the piston 29 which leaves a small clearance between its inside surface and the outer envelope of the cylindrical springs 47.

Figure 5:
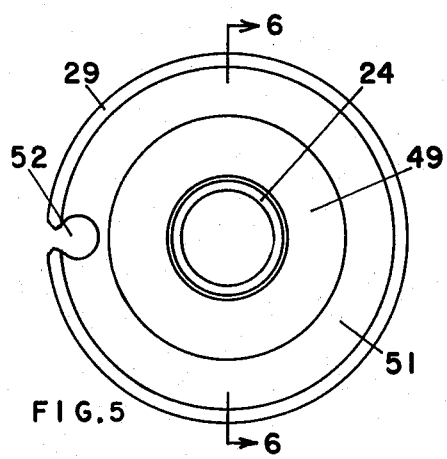
FIG. 5 is a front view of a piston positionner equipped with annular springs used alternatively in the energy conversion unit.
Figure 6:
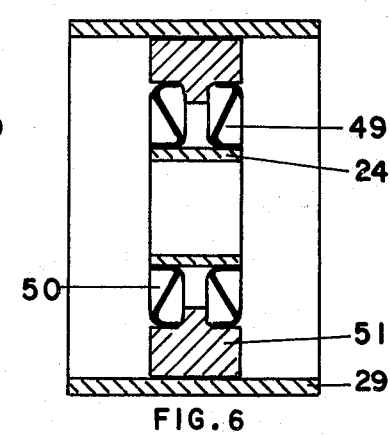
FIG. 6 is a longitudinal section of the piston positionner along the line 6—6 of FIG. 5.

FIGS. 5 and 6 show another possible arrangement for the piston positionner; the crankpin bearing 24 is surrounded by two annular springs 49 and 50 which are surrounded by an annular rigid spacer 51, having a suitable cut-out 52 to clear the radial blade 14. The piston surrounds the annular springs with a small radial clearence.

I claim:

1. In a mechano-fluid energy conversion unit of the oscillating piston type and featuring a cylindrical bore in a casing provided with fluid admission and evacuation ports and enclosed with two end covers containing concentrically located bearings supporting a single throw crankshaft; a combination consisting of a straight longitudinal groove located between the admission and evacuation ports in said casing, said groove originating at the cylindrical surface of the bore, of a straight radial groove in each end cover, said grooves originating at the end surfaces of the bore and having the same width and depth as the longitudinal groove, of a straight rectangular blade located radially within the bore and tightly engaged along three of its sides in the said three grooves, of a thin walled cylindrical piston surrounding the crankshaft and oscillating with its axis parallel to the bore axis, said piston being made of springy material and having the length of the bore, an outside diameter smaller than that of the bore and a round edged narrow cut along its entire length, of two identical sealing blades installed between the radially located blade and said piston, said sealing blades having suitable narrow cross section and the same length as the bore and being squeezed with a continuous moderate clamping pressure exerted by the piston, of flexible sealing devices located at both axial ends of piston's inner surface, said sealing devices being radially and axially preloaded to seal against the inside surface of the piston and the end surfaces of the bore of a bearing surrounding the crankpin of said crankshaft, of a piston positionning assembly located between the crankshaft and said piston and provided with a cut-out to clear the radially located blade and the sealing blades and with elastic radial movement with respect to the crank center, said piston positionning assembly transmitting the appropriate torque and radial loads between said piston and crankshaft and ensuring a preloaded revolving contact line between piston's outer surface and the cylindrical surface of the bore, of bevelled end surfaces for said casing, of matching annular peripheries for said end covers, said end surfaces acting as seats for said annular peripheries, and of suitable linings for the cylindrical surface of the bore, for the said sealing blades and for the said flexible sealing devices.

2. The combination of claim 1 wherein the radially located blade has a constant narrow cross section of rectangular shape and finely finished plane rectangular surfaces, and is made of high strength wear resisting material.

3. The combination of claim 1 wherein each of the two identical sealing blades is made of high strength material, has a suitably grooved surface maintaining in operation a continuous contact with piston's corresponding round edge and a plane surface covered with a lining made of suitable bearing material, said lining sliding with a reciprocating motion on the radially located blade and being continuously pressed by the piston against the radial blade.

4. The combination of claim 1 wherein, for a converter handling a compressible fluid, the piston positionning assembly is eccentrically located with respect to the crank center, said eccentricity being in the direction which, in the high pressure region, increases the preload forces at the revolving contact line between the piston and the cylindrical surface of the bore, and which decreases said forces in the low pressure region.

5. The combination of claim 1 wherein each of the two flexible sealing devices is made of a circular thin strip of springy material, each said strip having uniformly spaced narrow bowed extensions and carrying, around one or both of its cylindrical surfaces, narrow strips of suitable bearing material, each said device being located around piston's inner surface, in the space left between each end surface of the bore and the corresponding side surface of the part in the piston positionning assembly closest to the piston.

6. The combination of claim 1 wherein the piston positionning assembly consists of an annular block of elastic material secured to the crankpin bearing and extending to piston's inner surface, said block having a slot to clear the blade and a suitable cross section.

7. The combination of claim 1 wherein the piston positionning assembly consists of an annular rigid block secured around the crankpin bearing and having a slot to clear the radially located blade, and of seveal springs of suitable material, shape and dimensions, said springs being nested in appropriate recesses in said block, outside the blade clearing slot, and extending to piston's inner surface.

8. The combination of claim 1 wherein the piston positionning assembly consists of several annular springs of suitable material and dimensions, secured to the crankpin bearing at suitable locations along it, and of an annular rigid spacer located between the outer peripheries of said annular springs and piston's inner surface, said spacer having a slot to clear the radially located blade.

9. The combination of claim 1 wherein the linings for the cylindrical surface of the bore, for the said sealing blades and for the said flexible sealing devices are made of self-lubricating material.

* * * * *